March 15, 1960   D. H. GRANGAARD   2,928,868
MANUFACTURE OF CELLULOSIC PRODUCTS
Filed April 25, 1958
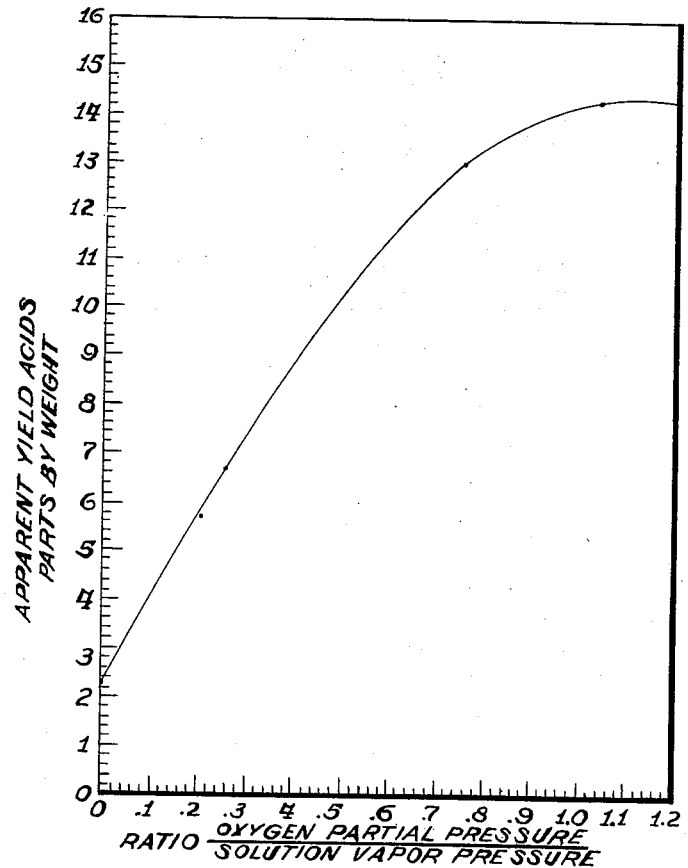
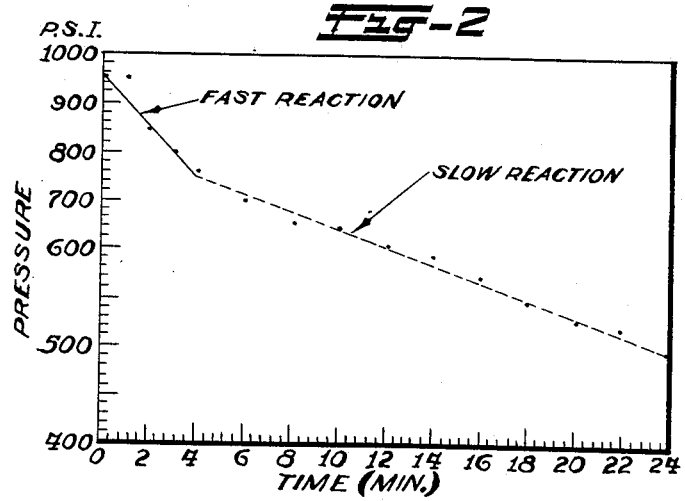

United States Patent Office 2,928,868
Patented Mar. 15, 1960

2,928,868

MANUFACTURE OF CELLULOSIC PRODUCTS

Donald H. Grangaard, Appleton, Wis., assignor to Kimberly-Clark Corporation, Neenah, Wis., a corporation of Delaware Application April 25, 1958, Serial No. 731,034

5 Claims. (Cl. 260—515)

The present invention is concerned with a method for processing cellulosic waste material for the recovery of useful products. More particularly it is concerned with the processing of the ligneous wastes from cellulosic pulping operations for the production and recovery of organic acids.

In conventional processes for pulping woods there are produced vast quantities of waste materials. These waste materials usually include lignin, simple sugars resulting from the hydrolysis of cellulose and hemi-cellulose, and smaller proportions of inorganic salts and other waste materials. These solids are suspended or dissolved in the aqueous waste cooking liquor and in the case of sulfite liquors constitute about 10 to 12 percent by weight of the liquor. About 2,500,000 tons of spent liquor solids from the sulfite pulping process alone are produced annually in the United States.

The solids in the spent cooking liquors are in a form which is difficult to convert to useful products by conventional methods. Therefore the predominant part of the spent liquor solids produced in the United States is disposed of either by dumping the spent cooking liquor from sulfite pulping process into streams or by concentrating and burning the wastes from alkaline pulping process.

Both disposal methods result in the loss of substantial quantities of potentially valuable organic raw materials. The disposal of sulfite waste by dumping into streams may, to some extent, deplete the available oxygen in the stream since part of the waste is in a form that readily takes up oxygen. The addition of solids to the stream may also tend to change the composition of the stream. On the other hand, the burning of the alkaline waste liquor, although it serves to produce heat as well as to recover the inorganic constituents, nevertheless constitutes a considerable loss of the potentially valuable organic materials. Further, it is not the most economical method of obtaining heat.

Various methods have been suggested to recover useful products from the ligneous and other wastes of pulping processes. Most of these recovery efforts have been based upon the physical properties of the waste liquor. For example, there has been some use of the waste liquors for soil modifiers, adhesives, emulsifying agents, road-binders, tanning agents and the like. There have also been processes to produce heat or to obtain products such as vanillin, yeast, alcohol and improved tanning agents from waste liquor, by various reaction and extraction processes. In general, however, if the time of the reaction was short, the conditions of temperature, pressure, etc., were so severe that all carbon compounds present were substantially completely degraded. On the other hand, if less severe conditions of temperature, pressure, etc., were employed, complex organic molecules could be recovered, but the reaction times required to obtain useful products were long, and produced low overall yields. Therefore such processes were usually carried out as batch type operations. The total recovery of useful products by all methods has been very small.

It is an object of the present invention to provide a method for the recovery of useful products from carbonaceous materials.

It is a further object to provide a continuous process for the production of organic acids from ligneous waste materials, and the recovery of said acids.

It is an additional object of the present invention to provide a high yield process whereby ligneous wastes are converted into organic acids in reaction periods short enough to permit the continuous processing of ligneous wastes into organic acids, and the recovery of said acids.

It is an additional object to provide a process for the production of organic acids from waste materials from cellulosic processes and the recovery of said acids.

Other objects of the present invention will be apparent from the detailed description which follows.

It has been discovered in accordance with the process of the present invention that organic materials and particularly ligneous wastes can be converted into readily recoverable organic acids by a process of partial oxidation of the ligneous wastes. Broadly, the process of the present invention comprises the treatment of a ligneous waste material, in an aqueous medium, at elevated temperatures, with a gaseous oxygen atmosphere, under controlled conditions of hydrogen ion concentration, temperature, oxygen partial pressure, and interfacial surface to solution volume ratio. The solids wastes are normally processed at a concentration of between about 2 and 30 percent by weight. The active oxidizing agent is oxygen which is maintained in contact with the solution under a partial pressure such that the ratio of the oxygen partial pressure to the vapor pressure of the aqueous medium containing the ligneous material is greater than about 0.35 and preferably greater than about 0.5. The temperature is maintained between about 100 and 225° C., and preferably between about 140 and 170° C. The hydrogen ion concentration of the solution is controlled during the reaction period by carrying out the reaction in the presence of sufficient alkali so that the pH is maintained above about 6.5. The solution containing the organic material is maintained under conditions of temperature and oxygen partial pressure within the above limits until the solution contains a substantial part of the original organic material in the form of organic acids. The time is related to the partial oxygen pressure, the ratio of the surface area of the solution in contact with the oxygen to the volume of the solution, the temperature of the solution and the concentration of the ligneous material in the solution. The initial reaction rate is rapid and under the preferred conditions, the reaction may be substantially completed within about 4 to 6 minutes. The organic acids produced by the present process include acetic, formic, fumaric, succinic, pyromellitic, and similar acids. These acids produced by the reactions of the process of this invention are readily recovered from the solution in accordance with the methods described in the present specification.

In the drawings:

Figure 1 is a graph illustrating the apparent yield of acids obtained under various conditions of the oxygen partial pressure expressed as the ratio of oxygen partial pressure to the vapor pressure of the reaction solution at the reaction solution temperature.

Figure 2 is a graph illustrating the reaction rate of a typical reaction.

The reaction when employed as a batch type process may be carried out in conventional pressurized reaction vessels where the reaction solution is maintained in contact with a gaseous oxygen atmosphere in the dome of the normally spherical or cylindrical reaction vessel. A typical vessel might have internal dimensions of 8 feet in diameter, 24 feet in height and a total volume of 1210 cubic feet. If such a vessel were filled with reaction solution to a depth of 20 feet, leaving a four foot gas space, the ratio of gas-solution interfacial area in square feet to solution volume in cubic feet would be 0.05. The term "gas-solution interfacial area" is used throughout the present specification and claims to define the area of the reaction solution which is in contact with the gaseous atmosphere.

We have found that the ratio of gas-solution interfacial area to solution volume is of the greatest importance in the successful production of organic acids and other by-products by the partial oxidation of ligneous wastes and like material in accordance with the present process. In general this ratio must be greater than about one and preferably greater than about four. It is therefore necessary to increase the ratio of total gas-solution interfacial area to solution volume substantially over that which normally exists in a conventional reactor vessel of the type employed in batch operations.

The term "solution volume" is used throughout the present specification and claims to include the total volume occupied by the reaction solution and solids suspended therein both within the reaction vessel and in any re-entrant side stream and may be referred to as "$v$."

The ratio of total gas-solution interfacial area to solution volume can be increased in several ways. One method comprises the passage of gaseous oxygen through the solution during the reaction. The oxygen may be introduced at or near the bottom of the reaction vessel during the reaction period so that the oxygen gas bubbles throughout the reaction period. This establishes a discontinuous gas-solution interfacial area which greatly increases the ratio of total gas-solution interfacial area to solution volume. The oxygen is preferably introduced through distributor nozzles or with agitation so that the gas bubbles achieve a minimum size and are evenly dispersed throughout the solution. Modern methods of simultaneously mixing a gas in a liquid and producing liquid shear in reaction vessels, for example by turbo mixing, can also advantageously be employed.

The solubility of the oxygen in the solution is not appreciably affected by the presence of other indifferent gases in the system. Therefore, not only pure oxygen can be used in the system but any oxygen containing gas in which the diluent gas or gases are inert can be used in the gas transfer apparatus and reaction vessel. However, the minimum partial pressure of the oxygen must be maintained within the limits specified in the present specification. It is therefore desirable to use a relatively concentrated oxygen-atmosphere since the total atmospheric pressure can thus be maintained at the lowest possible figure during the reaction period. The inert gases may be removed during the reaction from the gas space in the reaction vessel in order to maintain the total pressure in the reaction vessel at a minimum.

The term "continuous gas-solution interfacial area" is used throughout the present specification and claims to describe the surface of the main body of the reaction solution which is in continuous static contact with the oxygen atmosphere at the top of the reaction vessel. The term "discontinuous gas-solution interfacial area" refers to all other surfaces of the reaction solution which are exposed dynamically to an oxygen atmosphere, for example, the reaction solution surface exposed to bubbles of oxygen which are passed through the main body of reaction solution in the reaction vessel, or the surface of a side stream of reaction solution from the reaction vessel which is exposed to a gaseous atmosphere in a vapor-liquid transfer apparatus separate from the reaction vessel. The term "side stream" refers to the stream of reactor solution which is removed from the main body of the solution and then returned to the main body of solution after passing through a gas transfer apparatus of some variety. The term "total gas-solution interfacial area" refers to the sum of the continuous and discontinuous interfacial areas. This area is designated as "$a$" in the present specification and claims.

An additional method of obtaining a maximum transfer of oxygen to the reaction solution in batch type operation is by circulation of a portion of the reaction solution through an oxygen atmosphere in such a manner that the interfacial area of the side stream in contact with the gaseous oxygen is very large in proportion to the volume of the side stream. In this manner the total gas-solution interfacial area to solution volume ratio is increased to a value of at least one. This may be done by removing a portion of the reactor solution as a side stream and returning the side stream to the main body of the solution by passing it in a finely divided state through the oxygen atmosphere in the top of the reaction vessel. A side stream may, for example, be pumped through a spray nozzle or perforated cone in the top of a reaction vessel. This will result in a discontinuous gas-solution interfacial area wherein the surface area to volume ratio will be very large and the liquid surface will be in a dynamic state.

Alternatively, a side stream of the reaction solution may be circulated through an exterior gas-liquid contactor wherein the liquid is passed in contact with an oxygen atmosphere. Conventional vapor-liquid contactors such as spray towers, wetted wall columns, perforated plate towers, bubble cap plate towers, sieve plate towers, packed towers, turbo mixers, and other types of vapor-liquid apparatus such as are described in Chapters 23–26, 35 and 36, Unit Operations, G. G. Brown, 1950 edition, John Wiley & Sons, may be used. All such methods of vapor-liquid transfer are based at least in part upon obtaining a ratio of gas-liquid interfacial area to liquid volume substantially greater than is normally present in the static interfacial area between the atmosphere and the reaction solution in a reactor pressure vessel. The interfacial area in such apparatus is also a dynamic one so that the transfer of oxygen to the solution is most effective.

The partial pressure of the oxygen in the vapor-liquid transfer apparatus is normally maintained at the same or a greater partial pressure than the oxygen in the reaction vessel. The side stream which is returned to the digester from the vapor-liquid contactor may be introduced into the digester in the gas space above the solution but is preferably introduced beneath the surface of the solution so that maximum mixing of the side stream and the main body of the reaction solution is obtained. Other methods of agitating the main body of the reactor solution may also be used within the reactor.

The volume of cooking solution passed as a side stream through the oxygen-solution contactor may depend upon several factors including the efficiency of the contactor, the oxygen partial pressure and the time and temperature of the reaction period. The amount of solution required to pass through the particular vapor-liquid traisfer apparatus under the desired conditions of temperature, pressure and reaction time, in order to achieve satisfactory oxygen solution in the reaction solution can be determined by routine experimentation for the particular condition of the reaction time, temperature, etc. It may vary, for example, from ½ gallon per minute per cubic foot of solution volume with efficient vapor contactors to one or more gallons per minute per cubic foot of solution volume with less efficient vapor-liquid transfer apparatus. The ratio of the total gas-liquid interfacial area to solution volume or $$\frac{a}{v}$$

is substantially greater than the ratio of continuous gas-solution interfacial area to solution volume and must be greater than about 1.0. As large an interfacial area as desired may be used but there is no advantage in expanding the area beyond that which will result in substantial saturation of the reaction solution with oxygen.

Now, in addition to the importance of the area to volume ratio in the present process, the ratio of the partial pressure of oxygen in contact with the reaction solution to the vapor pressure of the reaction solution at the reaction temperature is also of the greatest importance. It has been found that in order to convert ligneous solids into organic acids under the conditions of the present process previously mentioned, the partial pressure of the oxygen in contact with the solution should be at least in a ratio to the vapor pressure of the solution of 0.35 and preferably above 0.5. It has been found that the maximum yield is obtained when the ratio is about 0.75 to 1.0 and further increases in the ratio do not substantially increase the yield of acids. More complex degradation products of lignin may be formed in small quantities at lower ratio values but the yield of these products falls off rapidly at ratios above about 0.25.

The significance of the ratio of oxygen partial pressure in contact with the solution to vapor pressure of the solution at a given reaction temperature is illustrated in the Figure 1. Figure 1 is a graph illustrating the curve obtained when the apparaent acid yield of reaction mixtures is plotted against various ratios of oxygen partial pressure to solution vapor pressure. The curve is based upon data obtained from a series of examples. In each example 200 ccs. of sulfite waste liquor having a solids content of 10.9 percent was diluted with 200 ccs. of water. Sixty grams of sodium hydroxide was then added to the reaction mixture and the reaction mixture maintained in contact with a compressed air atmosphere for one hour under conditions such that the solution area to solution volume ratio was greater than one, and the ratio of oxygen partial pressure to vapor pressure of the solution was that shown in the table. The apparent yield of acids expressed as formic acid was obtained by titration of an aliquot of the resultant reaction solution which had been passed through a column of a cation exchange resin in the hydrogen form. The actual yield of organic acids may be slightly lower than the values shown in the table and graph since the sulfite waste liquor contains a small amount of combined sulfur which is converted by the process to sulfuric acid. The temperatures of the reaction mixtures were between 160 and 170° C., and the final pH of the reacted mixtures were between 12.5 and 12.7. The yields are shown in the following table.

TABLE I

| Example No. | Oxygen Partial Pressure—Ratio of Solution Vapor Pressure | Apparent Yield Acids, Grams |
|---|---|---|
| 1 | 0 | 2.254 |
| 2 | 0.25 | 6.624 |
| 3 | 0.50 | 10.212 |
| 4 | 0.75 | 12.972 |
| 5 | 1.00 | 14.260 |

The process of the present invention can be used to produce organic acids from ligneous materials in a batch reaction. However, the process of the present invention is particularly advantageous when it is employed to produce organic acids from ligneous wastes by a continuous method. It has been found that when solutions of ligneous wastes are treated with an oxygen containing atmosphere at the temperature, hydrogen ion concentration, ratio of the interfacial area of the solution to solution volume, and ratio of partial oxygen pressure to solution vapor pressure which have been specified, the reaction will produce high yields of organic acids in comparatively brief periods, for example, one or more minutes. Thus aqueous solutions of ligneous wastes can be pumped through a reaction zone in which the foregoing specified conditions are maintained so that each increment of the suspension is maintained within the reaction zone for a period of from about 1 to 30 minutes and preferably about 4 to 15 minutes and satisfactory yields of acids are thereby obtained. This reaction may be carried out in a pipe reactor, a column reactor or other conventional chemical apparatus for continuously reacting liquids with gases. The reaction can be carried out for longer than 30 minutes but as will be shown in subsequent examples the reaction rate changes from a fast rate to a slow rate at the end of about 4 to 6 minutes under typical conditions and little increase in yield is obtained by carrying out the reaction for a longer period. In fact, in some instances decreases in yield have been observed when the reaction is carried out for longer periods.

The reaction rate of the reaction was determined by the following example.

*Example 6*

In this example 200 cc. of sulfite waste liquor having a solids content of 10.9 percent which had been diluted to 400 cc. volume with water, and then made alkaline with 60 grams of sodium hydroxide was reacted with oxygen in a reactor in which the ratio of interfacial surface to volume of the solution was greater than one. The initial pressure of oxygen pressure plus vapor pressure was 950 p.s.i. and the reaction temperature was 210±10° C. The reaction period was 24 minutes and the total yield of acids was 16.560 grams. The pressure drop of the atmosphere in contact with the reaction mixture was measured at regular time intervals during the reaction period. The pressure drop corresponds to the oxygen consumption and is thus an indication of the reaction rate. The pressures of the atmosphere in the reaction vessel at the particular time intervals are shown in the following table:

TABLE II

| Time, minutes: | Pressure, p.s.i. g. |
|---|---|
| 0 | 950 |
| 1 | 950 |
| 2 | 850 |
| 3 | 800 |
| 4 | 760 |
| 6 | 700 |
| 8 | 650 |
| 10 | 640 |
| 12 | 610 |
| 14 | 590 |
| 16 | 575 |
| 18 | 550 |
| 20 | 540 |
| 22 | 525 |
| 24 | 500 |

These values have been plotted in a curve illustrated in Figure 2, in which the time is shown on the abscissa and the pressure is shown on the ordinate. It will be noted that the initial reaction rate (shown as the solid line) is rapid but that this initial rapid rate changes to a much slower rate (shown as the dotted line) after about six minutes. It is thus apparent that substantial yields of acid are obtained in reaction times of the order of four to six minutes.

The process of the present invention is generally applicable to the processing of ligneous wastes produced in the pulping of wood. It may be applied to the processing of sulfite waste liquor, semichemical pulping waste liquors, and other waste liquors produced in wood pulping operations. The process may also be applied to relatively pure ligneous raw materials, for example, solutions of purified kraft lignin, Scholler lignin, etc. Other ligneous waste materials, for example, aqueous suspensions of comminuted wood such as saw dust and other finely granulated ligneous raw material may be processed by the present method. Fragments of ligneous material which have retained their fibrous character, such as wood chips, straw, bagasse, etc., can be treated by the process of the present invention to produce organic acids but would be preferably processed to produce pulp and organic acids in accordance with the method described in the copending United States application Serial No. 677,750, filed August 12, 1957, which is assigned to the assignee of this invention. The process may also be applied to other carbonaceous materials such as organic wastes, humic acids, phenolic wastes, sugar wastes, etc.

The solids to water ratio in the reaction solution may vary considerably. The total amount of dissolved and suspended solids is preferably maintained between about 2 and 30 percent by weight of the reaction solution. More dilute solutions can be processed by the present invention but it would be preferable to concentrate these solutions by evaporation prior to processing. More concentrated solutions of waste material can also be processed by the present method although the mechanical handling problems of handling such concentrated mixtures might make it desirable to dilute the mixtures to the preferred concentration range.

The reaction is carried out in the presence of an alkali capable of maintaining the hydrogen ion concentration of the reaction solution so that the pH of the solution is greater than about 6.5 upon termination of the reaction. The term "alkali" is used in this disclosure in its more general application to include any strong base in aqueous solution. The maintenance of pH may be accomplished by the initial addition to the reaction mixture solution of a strong base such as sodium hydroxide or of a weak base in a buffer solution such as sodium bicarbonate in a quantity sufficient to maintain the pH of the solution above about 6.5 throughout the reaction period. A high initial alkali content is not harmful to the reaction and excellent yields of organic acids have been obtained when the pH of the solution at the termination of the reaction has been as high as 13. The pH may also be maintained at a value greater than about 6.5 by the continuous or intermittent addition throughout the reaction period of an alkali in quantities sufficient to neutralize the free acids formed during the reaction. The hydroxides, carbonates and bicarbonates of the alkali and alkaline earth metals are particularly suitable bases. A single salt may be used or several salts may be used. Particularly suitable bases or salts are sodium hydroxide, sodium carbonate, sodium bicarbonate, barium hydroxide, calcium hydroxide, calcium carbonates, and mixtures of sodium hydroxide and calcium hydroxide and of calcium carbonate and calcium hydroxide.

The digestion should be carried out between temperatures of approximately 100 and 225° C., and preferably between about 140 and 170° C. The reaction may vary from approximately one or more minutes under optimum conditions to thirty minutes or more under less favorable conditions. The reaction should be terminated in any event before any substantial proportion of the organic acids formed are converted into carbon dioxide and water.

Upon completion of the reaction period the reaction mixture is removed from the reaction vessel. The ligneous waste liquid undergoes substantial changes in color, clarity and viscosity during the reaction period. For example, the dark brownish characteristic liquor from the sulfite pulping of wood is converted into a liquid having a color from light tan to water white, a considerably lower viscosity and substantially greater clarity. If there is any remaining oxidizable organic matter in the liquid after separation of the organic acids from the liquid, this material may be reprocessed until substantially all oxidizable matter has been removed leaving a clear colorless non-polluting liquid. This may be disposed of in streams without causing any discoloration or increased biochemical oxygen demand.

The liquid which is obtained by carrying out the process of the present invention contains a substantial part of the original organic solids as organic acids particularly fumaric, acetic, formic, oxalic, malonic, succinic and pyromellitic. These acids may be recovered from the resultant liquor by various methods. The liquor may be concentrated by evaporation, as a first step in the recovery process but this is not a necessary step and the liquor can be processed without such concentration. In one method of recovery, the liquor is acidified with a strong acid such as sulfuric to a pH of about 2 whereupon a slight precipitate may form. The amount of precipitate at this stage is dependent upon the conditions under which the reaction has been carried out. The precipitate, if one forms, is separated from the supernatant solution by filtration, or other convention methods of separating solids from liquids. This precipitate, together with the other organic wastes from the various separation steps, can be recycled so that the present process contemplates the complete conversion of all organic material in ligneous wastes to organic acids or other usable by-products.

The supernatant solution obtained after separation of the precipitate may be extracted with an organic solvent such as ether to produce an organic extract. The ether extract on distillation to a ratio of distillate to residue of about 2 or 2½ to 1 produces a distillate mixture of formic and acetic acids and a residue which is a mixture of higher molecular weight acids such as fumaric, succinic and pyromellitic. The residue may be set aside for further processing by conventional methods of fractional distillation, solvent extraction or recrystallization. The acetic and formic acids may be recovered separately from the distillate by conventional methods. It has been found that the yield of acetic and formic acids from sulfite waste liquors may amount to a total of 150 to 300 pounds of acid per ton of pulp produced. Other fractions obtained in the foregoing processing method may also be treated to obtain additional organic acids. For example, extraction of the ether extract raffinate with n-butanol produces a butanol extract rich in the butanol esters of various organic acids.

The production of various acids can be optimized by variations in the conditions of the present process. For example, the production of oxalic acid can be maximized by carrying out the reaction under conditions of high alkalinity. An increase in alkalinity likewise increases the ratio of yields of formic acid to acetic acid.

The following examples are for the purpose of illustrating the present invention as employed in batch type operations.

*Example 7*

Three hundred parts by weight of sodium lignin sulfonate was suspended in 2000 parts by weight of water. Sodium hydroxide was added to the suspension until a pH of 7.8 was attained and the suspension stirred until the sodium lignin sulfonate was completely dissolved. The solution was then diluted with 14,000 parts by weight of water. Two hundred parts by weight of sodium bicarbonate was added to the solution. The solution was then introduced into a cylindrical reaction vessel. A side stream of the solution was passed through a heater and then returned to the reaction vessel through a low angle (50°) spray nozzle set in the dome of the vessel so that the side stream was sprayed through the gas portion of the vessel before reentering the solution. The side stream was circulated at a rate of 10,200 parts by weight per minute. The temperature of the solution was brought up to a temperature of 140° C., and the gas in the dome of the vessel was then removed and replaced with oxygen under a total pressure of 200 pounds per square inch gauge or a partial pressure of oxygen of 162 pounds per square inch absolute. The ratio of oxygen partial pressure to vapor pressure was thus 3.10. The solution was maintained under this pressure and temperature for a period of six hours. The side stream of reaction solution was passed through the oxygen atmosphere in the dome of the reaction vessel during the entire period. The gaseous oxygen atmosphere in the reaction vessel was blown every hour and replaced with fresh oxygen. The ratio of continuous interfacial area in square feet to solution volume in cubic feet was 1.33. By calculation, it was determined that the instantaneous surface area of the solution spray in the oxygen atmosphere was approximately 2.42 square feet. The total interfacial area to solution volume ratio was 5.63. The side stream spray thus increased the interfacial area to volume ratio by a factor of about 4. Upon completion of the reaction period the resulting solution was found to have a pH of 8.7. The solution was then acidified with sulfuric acid to a pH of 1.5 and a precipitate which formed was separated from the solution and found to be 19.5 parts by weight. The precipitate is organic matter and is apparently largely degradation products of the oxidized noncellulosic matter. The supernatant solution which contained the dissolved organic acids was then processed in a separate procedure for the recovery of the individual acids.

*Example 8*

Six thousand and fifty parts by weight of sulfite waste liquor containing 604 parts by weight of ligneous solids was diluted with water to 16,050 parts by weight. Sodium hydroxide was then added to the solution until a pH of 7.5 was attained and 300 parts by weight of sodium bicarbonate was added to the solution. The solution was then introduced into the reaction vessel described in Example 7 and maintained for a reaction period of six hours under conditions of temperature, total pressure and partial oxygen pressure identical to those described in Example 7. A side stream of the reaction solution was circulated through a spray in the dome of the reaction vessel such that the total interfacial area-solution volume was greater than one. Upon completion of the reaction period the pH of the solution was 7.3. The reaction solution was removed from the reaction vessel and acidified to a pH of 2 with sulfuric acid. The precipitate which formed was found to be 87.4 parts by weight. The precipitate was separated from the solution and the supernatant liquid processed as will hereinafter be shown for recovery of the individual acids.

*Example 9*

Six thousand seven hundred and twenty parts by weight of sulfite waste liquor containing 644.7 parts by weight of solids was divided into 16 equal parts which were processed individually. To each part, sodium hydroxide was added to a pH of 7.0 and 30 parts by weight of sodium bicarbonate then added. The part was then placed in a reaction vessel under an oxygen pressure of 800 pounds per square inch gauge. The solution was heated to a temperature of 160° C., and maintained at that temperature for a period of three hours. The ratio of oxygen partial pressure to vapor pressure was thus 8.0. The final pH's of the parts ranged from 7.2 to 7.4. The parts were combined, concentrated to a volume 16 percent as large as the original volume of the waste liquor and acidified to a pH of 1.5 with sulfuric acid. A very small precipitate formed and upon separation from the solution was found to be 3.9 parts by weight. The processing of the supernatant will be described subsequently.

*Example 10*

Three hundred parts by weight of kraft lignin was suspended in 2000 parts by weight of water. The lignin was then dissolved by adding sodium hydroxide until a pH of 8.8 was attained with agitation. Two hundred parts by weight of sodium bicarbonate was then added to the solution and the resultant solution diluted to a total volume of 16,000 parts by volume. The resultant solution was introduced into a reaction vessel and reacted under conditions of time, temperature, total pressure and oxygen partial presure identical to those of Example 7. A side stream of the reaction liquid was circulated through a low angle spray in the gas space of the reactor at a rate such that the ratio of total area-interfacial area in square feet to solution volume in cubic feet was greater than one. The final pH of the solution was 8.8. Upon completion of the reaction period the solution was removed from the reaction vessel acidified to a pH of 2 with sulfuric acid. The precipitate was separated from the solution and found to be 74.3 parts by weight. The processing of the supernatant solution will be subsequently described.

*Example 11*

One thousand parts by weight of spruce wood chips was suspended in 16,000 parts by weight of water containing 500 parts by weight of sodium bicarbonate. This suspension was digested in a reaction vessel for a period of six hours at a temperature of 140° C. The digestion was carried out under an oxygen atmosphere having a partial pressure of oxygen of 162 pounds per square inch. The ratio of oxygen partial pressure to vapor pressure was 3.10. The total pressure in the vessel was 200 pounds per square inch. A side stream of the reaction solution was circulated through a low angle spray in the dome of the reaction vessel at a rate such that the ratio of the total interfacial area in square feet to the solution volume in cubic feet was greater than one. Upon completion of the digestion period the resultant solution was separated from the pulp produced by the digestion. Two additional identical pulping operations were carried out. The final pH's ranged from 8.9 to 9.1. After the pulp was separated the cooking liquor from the three digestions was combined and concentrated to a total volume of 1000 parts by volume. The resultant solution was then acidified with sulfuric acid to a pH of 2. The precipitate which formed was separated and found to be 328.6 parts by weight. The processing of the supernatant solution will be subsequently described.

*Example 12*

The process described in Example 11 was carried out with poplar chips under otherwise identical conditions to that described in Example 11. The final pH of the solutions ranged from 8.8 to 9.2. The solids resulting from the acidification of the waste liquor were found to be 170.8 parts by weight.

All of the supernatant solutions obtained in Examples 7–12 inclusive after separation of the acid insoluble precipitate following the acidification steps, were processed in the same manner. The quantities of the acid insoluble residues for each example are shown in column 1 of Table 3. The supernatant solution obtained after separation of the acid insoluble residue was extracted with ether and the ether extract was then distilled to a ratio of distillate to residue of about 2 to 1. The total quantity of the distillate fraction is shown in column 2. An analysis of this distillate showed it to be a mixture of formic and acetic acids. The quantities are shown in columns 2 and 4 of the table. The total quantity of the nondistillable fraction was then codistilled with decalin (decahydronaphthalene). The quantity of the fraction distillable in decalin is shown in column 6 and the quantity of the nondistillable fraction is shown in column 7. In the case of Examples 7, 9 and 10 the raffinate from the ether extraction was extracted with butanol. The total quantity of the butanol extract is shown in column 8. The quantity of the distillable fraction of the butanol extract is shown in column 9 and the quantity of the non-distillable fraction is shown in column 10. All quantities are shown as parts by weight.

TABLE III

| Example | Acid Insoluble Residue | Ether Extract | | | | | | Ether Extraction Raffinate | | |
|---|---|---|---|---|---|---|---|---|---|---|
| | | Distillable | | | Nondistillable | | | Butanol Extract | | |
| | | Total | Formic Acid | Acetic Acid | Total | Distillable in Decalin | Nondistillable in Decalin | Total | Distillable | Nondistillable |
| 7 | 19.5 | 26.5 | 9.5 | 7.1 | 31.7 | 7.7 | 24.0 | 46.9 | | 46.9 |
| 8 | 87.4 | 73.2 | 28.7 | 24.3 | 23.2 | 10.0 | 13.2 | | | |
| 9 | 3.9 | 75.2 | 29.0 | 24.0 | 30.6 | 15.4 | 15.2 | 50.0 | 20.6 | 29.4 |
| 10 | 74.3 | 35.6 | 15.4 | 9.1 | 26.4 | 5.9 | 20.5 | 41.2 | | 41.2 |
| 11 | 328.6 | 193.5 | 74.5 | 54.2 | 97.7 | 26.7 | 51.0 | | | |
| 12 | 170.8 | 228.6 | 52.2 | 88.7 | 75.2 | 24.8 | 50.4 | | | |

It will be noted that where similar examples were carried out at low pressure as in Example 8 and at high pressure as in Example 9, the acid insoluble residue obtained in the low pressure treatment was more than 20 times as great as that obtained in the high pressure treatment. In spite of this great difference in acid insoluble residues, however, the amount of acetic and formic acid obtained upon distillation of the ether extract from these samples were almost identical. The acid insoluble residues may be recycled by means of the process of the present invention and the yields thus increased. It is thus apparent that the low pressure oxygenation of ligneous waste materials yields larger returns of the organic acids than do high pressure reactions under similar conditions of time and temperature. This is a highly favorable aspect of the invention.

Process variables are illustrated in the following table in which are shown the yield of acids obtained in specific examples carried out in accordance with the process of the present invention. In each of these examples approximately equal quantities of ligneous material was treated. In the case of the kraft runs the material was 20 parts of kraft lignin suspended in 400 parts of water; in the sulfite waste liquor the quantity of solids was substantially the same as the quantity of kraft lignin employed in the kraft runs and the total volume of the suspension was the same as the volume of the suspension of kraft lignin. In all examples the alkali was added to the suspension of ligneous material and the resultant mixture introduced into a reaction vessel. In all examples except Nos. 25 and 26 the reaction vessel atmosphere was oxygen under 750 pounds partial pressure which was added to the reaction vessel and the reaction vessel then heated to 160±10° C., and maintained within that temperature range for the indicated time. In Examples Nos. 25 and 26 the reaction vessel containing the mixture was closed and brought up to the indicated temperature before the mixture was exposed to the oxygen atmosphere so that the oxygen atmosphere in this case was in contact with the reaction mixture for only the time indicated. The ratio of oxygen partial pressure to vapor pressure of the solution was 10.9 in all examples except No. 29. The ratio of reaction mixture area (total gas-solution interfacial area) in contact with the oxygen containing atmosphere to reaction mixture volume in all runs was greater than one. Upon completion of the reaction period the pH value of the reaction mixture was determined and is indicated in the column entitled "Final pH." A sample of the resultant reaction mixture after passing it through a cation exchange column was titrated to determine the acid yield. This acid yield is expressed as formic acid. The yield includes the total amount of acid recovered from the reaction mixture. In the case of the sulfite waste liquor runs the initial sulfite waste liquor contained approximately 5.94 parts of acid expressed as formic acid so that the actual yield is less than the indicated yield by this amount.

TABLE IV

| Example No. | Ligneous Material | Alkaline Material | | Temperature, °C. | Time, Minutes | Final pH | Apparent Yield Acids, Parts by Weight |
|---|---|---|---|---|---|---|---|
| | | Kind | Parts by Weight | | | | |
| 13 | Kraft | NaHCO₃ | 20 | 160±10 | 5 | 7.2 | 6.072 |
| 14 | do | NaHCO₃ | 20 | 160±10 | 5 | 7.9 | 8.004 |
| 15 | do | Na₂CO₃ | 20 | 160±10 | 5 | 7.4 | 7.636 |
| 16 | do | Na₂CO₃ | 120 | 160±10 | 5 | 9.4 | 12.420 |
| 17 | do | NaOH | 10 | 160±10 | 5 | 6.7 | 5.934 |
| 18 | do | NaOH | 30 | 160±10 | 5 | 8.5 | 13.800 |
| 19 | do | NaOH | 60 | 160±10 | 5 | 13.0 | 18.078 |
| 20 | S.W.L. | NaOH | 60 | 160±10 | 5 | 13.1 | ¹19.412 |
| 21 | S.W.L. | Ca(OH)₂ | 60 | 160±10 | 5 | 11.9 | ¹18.492 |
| 22 | Kraft | Ca(OH)₂ | 100 | 160±10 | 5 | 12.0 | 14.416 |
| 23 | S.W.L. | Ca(OH)₂ | 100 | 160±10 | 5 | 12.2 | ¹20.148 |
| 24 | S.W.L. | Ca(OH)₂ | 20 | 160±10 | 5 | 6.75 | ¹16.774 |
| 25 | S.W.L. | CaCO₃ | 76 | 160±10 | 60 | 6.1 | ¹11.040 |
| 26 | Kraft | NaOH | 60 | 160±10 | ²5 | 13.3 | 16.284 |
| 27 | do | NaOH | 60 | 160±10 | ²30 | 12.9 | 14.674 |
| 28 | do | NaOH | 60 | 160±10 | 180 | 12.9 | 15.962 |
| 29 | S.W.L. | NaOH | 60 | 110±10 | 5 | 12.9 | ¹17.664 |
| 30 | S.W.L. | Ca(OH)₂ | 120 | 160±10 | 5 | 12.9 | ¹18.331 |

¹ Includes 5.94 parts acid initially present in S.W.S.
² Time reaction mixture in contact with oxygen containing atmosphere.

Although the acid fractions have been recovered in the present examples by means of an ether extraction and distillation step other methods known to those experienced in the art, may also be used to recover the acids and other organic products produced by the process of the present invention. It will be apparent, however, from the foregoing examples that the process of the present invention is capable of converting ligneous wastes into useful organic acids and other products in readily recoverable form. At the same time the process is capable of removing all oxidizable material from ligneous wastes and thus can be so operated as to eliminate the problem of disposal of aqueous ligneous wastes from the manufacture of cellulosic products by pulping operations and other similar operations.

The actual organic acids present in the resultant reaction mixture of Example 20 and of a kraft lignin reaction mixture reacted under the same conditions as shown in Example 19, were separated from the reaction mixtures by ether extraction after acidification of the mixture. An analysis of the ether extracts indicated the following parts of individual acids:

TABLE V

PARTS OF ACIDS PER 20 PARTS OF DRY LIGNIN MATERIAL

| Acid | Kraft Lignin | Sulfite Waste Liquor Lignin |
| --- | --- | --- |
| Formic | 3.82 | 3.08 |
| Acetic | 1.46 | 1.28 |
| Lactic | 0.06 | 0.27 |
| Oxalic | 2.51 | 3.22 |
| Malonic | 0.54 | 0.22 |
| Fumaric | trace | trace |
| Succinic | 0.13 | 0.17 |
| Itaconic | trace | trace |
| Malic | 0.08 | trace |
| Unknown | 4.58 | 0.54 |

The following two examples illustrate the reactions of the present invention as employed in continuous methods for recovering acids from ligneous wastes.

*Example 31*

Kraft lignin solids are slurried with water so that each 400 parts of water contains 20 parts of kraft lignin. The resultant reaction mixture is then made alkaline with 60 parts of sodium hydroxide per 400 parts of mixture. The reaction mixture is then passed through a continuous reactor of the wetted wall column type such as is described on page 512 of Unit Operations, Brown, ibid., under conditions such that the ratio of the interfacial area of the solution in square feet to volume of the solution in cubic feet is 40. The temperature of the reaction solution is 150° C., and the oxygen partial pressure is maintained at 150 pounds per square inch so that the ratio of oxygen partial pressure to vapor pressure is 2.14. Each increment of the reaction mixture is retained in the apparatus for a period of approximately 5 minutes. Upon completion of the run the acids are recovered from the resultant reaction mixture.

*Example 32*

Sulfite waste liquor is diluted so that the waste liquor solids in 400 parts of waste liquor is approximately the same as the kraft liquor solids in the preceding example. The solution is then made alkaline with calcium hydroxide in the ratio of 100 parts of calcium hydroxide per 400 parts of the reaction mixture. The resulting mixture is then reacted in the reactor of Example 31 under identical reactor conditions to those described in Example 31. The acids are then recovered from the resultant reaction mixture.

The present invention is a continuation-in-part of co-pending application Serial No. 677,792, filed August 12, 1957.

It is apparent that numerous modifications can be made without departing from the scope of the present invention.

What is claimed is:

1. In the processing of spent cooking liquor from the group consisting of sulphite waste liquor, solutions of kraft lignin, and semichemical pulping waste liquor to obtain organic acids including at least one acid from the group consisting of fumaric, acetic, formic, oxalic, malonic, succinic, pyromellitic, lactic, itaconic, and malic, the method which comprises treating said liquor while maintained at a temperature of from about 100° C. to 225° C. with a gaseous atmosphere at superatmospheric pressure, maintaining said liquor throughout the process at a solids concentration of between 2% and 30% and a pH greater than about 6.5, maintaining in said atmosphere a ratio of oxygen partial pressure to vapor pressure of the solution of at least about 0.35 under conditions such that the $$\frac{a}{v}$$

ratio is greater than about one, where $a$ is the total gas-solution interfacial area in square feet and $v$ is the solution volume in cubic feet, and recovering the resultant organic acids.

2. In the processing of spent cooking liquor from the group consisting of sulphite waste liquor, solutions of kraft lignin, and semi-chemical pulping waste liquor to obtain organic acids including at least one acid from the group consisting of fumaric, acetic, formic, oxalic, malonic, succinic, pyromellitic, lactic, itaconic, and malic, the method which comprises treating said liquor while maintained at a temperature of from about 100° C. to 225° C. with a gaseous oxygen atmosphere at superatmospheric pressure, maintaining said liquor throughout the process at a solids concentration of between 2% and 30% and a pH greater than about 6.5, maintaining a ratio of oxygen partial pressure to vapor pressure of the solution of at least about 0.35, while treating at least a portion of said solution with gaseous oxygen under conditions such that the ratio of $$\frac{a}{v}$$

is greater than about four, in which $a$ is the total gas-solution interfacial area in square feet and $v$ is the solution volume in cubic feet, and recovering the resultant organic acids.

3. The method of claim 1 wherein the pH is maintained above 6.5 by an alkali material selected from the group consisting of the hydroxides, carbonates, and bi-carbonates of the alkali metals and the alkaline earth metals.

4. In the processing of spent cooking liquor from the group consisting of sulphite waste liquor, sloutions of kraft lignin, and semi-chemical pulping waste liquor to obtain organic acids including at least one acid from the group consisting of fumaric, acetic, formic, oxalic, malonic, succinic, pyromellitic, lactic, itaconic, and malic, the method which comprises maintaining said liquor at a solids concentration of between 2% and 30%, alkalizing said liquor to a pH substantially greater than 6.5, passing a continuous stream of said liquor while maintained at a temperature of from about 100° C. to 225° C. through a pressurized reaction zone in a manner such that the solution remains in the zone from about 1 to 30 minutes, maintaining in said reaction zone an oxygen atmosphere wherein the ratio of the partial pressure of oxygen to the vapor pressure of the solution is at least about 0.35 and the $$\frac{a}{v}$$

ratio is greater than about one, where $a$ is the total gas-solution interfacial area in square feet and $v$ is the solution volume in cubic feet, and recovering the resultant organic acids.

5. In the processing of spent cooking liquor from the group consisting of sulphite waste liquor, solutions of kraft lignin, and semi-chemical pulping waste liquor to obtain organic acids including at least one acid from the group consisting of fumaric, acetic, formic, oxalic, malonic, succinic, pyromellitic, lactic, itaconic, and malic, the method which comprises maintaining said liquor at a solids concentration of between 2% and 30%, alkalizing said liquor to a pH substantially greater than 6.5, passing a continuous stream of said liquor while maintained at a temperature of from about 100° C. to 225° C. through a pressurized reaction zone in a manner such that the solution remains in the zone from about 4 to 15 minutes, maintaining in said reaction zone an oxygen atmosphere wherein the ratio of the partial pressure of oxygen to the vapor pressure of the solution is at least about 0.50, and the $$\frac{a}{v}$$

ratio is greater than about four, where $a$ is the total gas-solution interfacial area in square feet and $v$ is the solution volume in cubic feet, and recovering the resultant organic acids.

References Cited in the file of this patent

UNITED STATES PATENTS

| 1,002,034 | Chute et al. | Aug. 29, 1911 |
| 1,681,156 | Mellanoff | Aug. 14, 1928 |